(12) United States Patent
Fukutome et al.

(10) Patent No.: US 11,417,923 B2
(45) Date of Patent: Aug. 16, 2022

(54) BATTERY PACK AND MANUFACTURING METHOD THEREFOR

(71) Applicant: SANYO Electric Co., Ltd., Daito (JP)

(72) Inventors: Kazuaki Fukutome, Hyogo (JP); Hiroshi Arikawa, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 199 days.

(21) Appl. No.: 16/629,117

(22) PCT Filed: Jul. 17, 2018

(86) PCT No.: PCT/JP2018/026690
§ 371 (c)(1),
(2) Date: Jan. 7, 2020

(87) PCT Pub. No.: WO2019/021880
PCT Pub. Date: Jan. 31, 2019

(65) Prior Publication Data
US 2020/0227799 A1 Jul. 16, 2020

(30) Foreign Application Priority Data

Jul. 24, 2017 (JP) .............................. JP2017-143045

(51) Int. Cl.
*H01M 10/659* (2014.01)
*H01M 10/643* (2014.01)
(Continued)

(52) U.S. Cl.
CPC ....... *H01M 10/659* (2015.04); *H01M 10/643* (2015.04); *H01M 10/653* (2015.04); *H01M 10/655* (2015.04); *H01M 50/20* (2021.01)

(58) Field of Classification Search
CPC .. H01M 10/659; H01M 50/20; H01M 10/643; H01M 10/653; H01M 10/655;
(Continued)

(56) References Cited

U.S. PATENT DOCUMENTS

| 2009/0297892 A1 | 12/2009 | Ijaz et al. |
| 2011/0293998 A1* | 12/2011 | Sato ................ H01M 50/502 439/890 |
| 2013/0004822 A1 | 1/2013 | Hashimoto et al. |

FOREIGN PATENT DOCUMENTS

| CN | 200976359 Y * 11/2007 ............ H01M 10/50 |
| CN | 201032639 Y * 3/2008 .......... H01M 10/425 |

(Continued)

OTHER PUBLICATIONS

International Search Report dated Oct. 2, 2018, issued in counterpart application No. PCT/JP2018/026690, with English translation. (4 pages).
(Continued)

*Primary Examiner* — Kaity V Chandler
(74) *Attorney, Agent, or Firm* — WHDA, LLP

(57) ABSTRACT

A battery pack includes a battery assembly, a heat radiation molding being molded in advance and having flexibility, and an external case housing the battery assembly. The battery assembly includes at least one secondary battery cell and a battery holder to hold and house the at least one secondary battery cell. A heat radiation molding covers a surface of the at least one secondary battery cell and is designed to melt in response to heat generated from the at least one secondary battery cell.

9 Claims, 8 Drawing Sheets

(51) Int. Cl.
  *H01M 10/653* (2014.01)
  *H01M 10/655* (2014.01)
  *H01M 50/20* (2021.01)

(58) Field of Classification Search
  CPC .............. H01M 50/213; H01M 50/24; H01M 10/6235; H01M 10/625; H01M 10/627; H01M 10/613; Y02E 60/10
  See application file for complete search history.

(56) References Cited

FOREIGN PATENT DOCUMENTS

| | | | | | |
|---|---|---|---|---|---|
| CN | 102195010 | A | * | 9/2011 | ............ H01M 10/50 |
| CN | 106104846 | A | * | 11/2016 | .......... H01M 10/613 |
| CN | 106558745 | A | * | 4/2017 | .......... H01M 10/613 |
| CN | 106654459 | A | * | 5/2017 | .......... H01M 10/653 |
| CN | 206163570 | U | * | 5/2017 | .......... H01M 10/613 |
| CN | 206711984 | U | * | 12/2017 | ........ H01M 10/0525 |
| CN | 206931687 | U | * | 1/2018 | .......... H01M 10/613 |
| JP | H09-92237 | A |  | 4/1997 | |
| JP | 2001-307784 | A |  | 11/2001 | |
| JP | 2001325996 | A | * | 11/2001 | .......... H01M 10/613 |
| JP | 2002184374 | A | * | 6/2002 | ............ H01M 10/50 |
| JP | 2005285456 | A | * | 10/2005 | ............ H01M 10/50 |
| JP | 2006339017 | A | * | 12/2006 | ............ H01M 10/40 |
| JP | 2010-62093 | A |  | 3/2010 | |
| JP | 2010114063 | A | * | 5/2010 | .......... H01M 10/613 |
| JP | 2011014537 | A | * | 1/2011 | ........ H01M 10/4207 |
| JP | 2011-521403 | A |  | 7/2011 | |
| JP | 2011-253747 | A |  | 12/2011 | |
| JP | 2013-12441 | A |  | 1/2013 | |
| JP | 2016-56352 | A |  | 4/2016 | |
| WO | WO-0180331 | A1 | * | 10/2001 | ......... F28D 15/0275 |
| WO | 2012/101954 | A1 |  | 8/2012 | |
| WO | WO-2014034020 | A1 | * | 3/2014 | ............ B60L 3/0007 |
| WO | WO-2016006143 | A1 | * | 1/2016 | ............ H01M 50/24 |

OTHER PUBLICATIONS

Extended (Supplementary) European Search Report dated Jun. 23, 2020, issued in counterpart application No. 18838503.3. (10 pages).

* cited by examiner

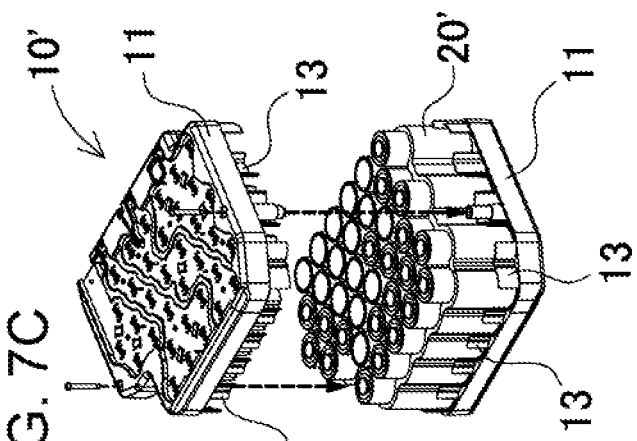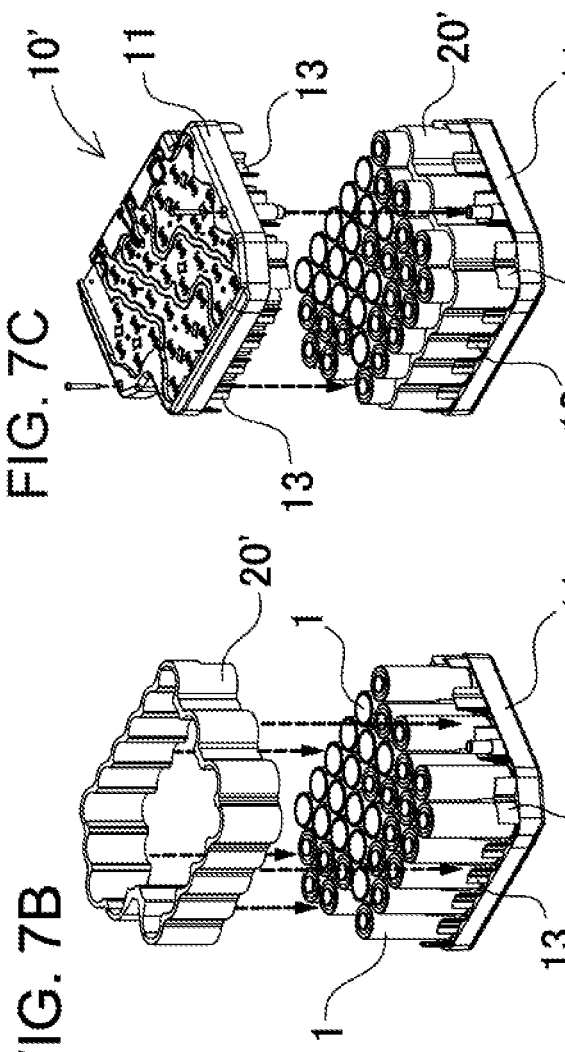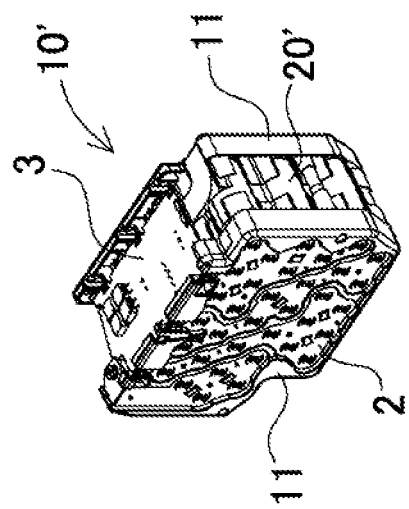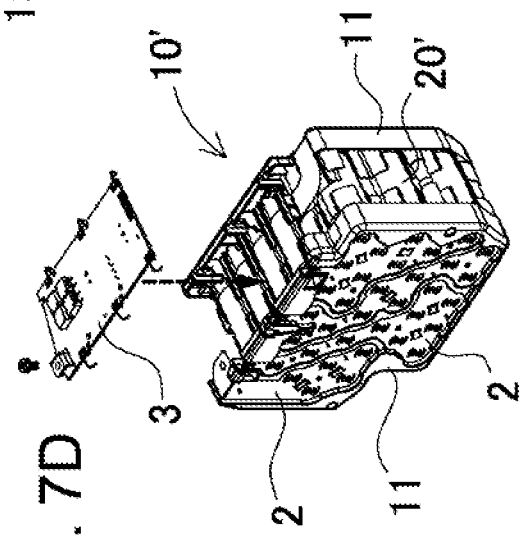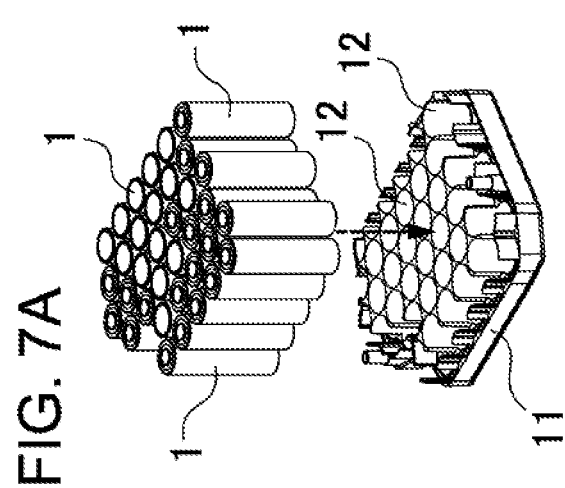

BATTERY PACK AND MANUFACTURING METHOD THEREFOR

TECHNICAL FIELD

The present invention relates to a battery pack and a method for manufacturing the battery pack.

BACKGROUND ART

Battery packs are widely used as power sources for electric tools, electric-assist bicycles, electric motorcycles, hybrid electric vehicles, electric vehicles, and other electric equipment, as well as for power storage purposes at households, stores, and other places. Such a battery pack includes a plurality of rechargeable secondary battery cells connected in series or in parallel to perform charging or discharging. For instance, as shown in FIG. 8, battery assembly 80 has a plurality of battery cells 81 housed in battery holder 82. Battery assembly 80 is housed in waterproof container 83 that is housed as a battery core pack in external case 84. Battery holder 82 arranges the plurality of battery cells 81 such that the battery cells are parallel to each other and electrode terminals formed on both ends of every battery cell 81 are in same respective planes. At both side faces of battery holder 82, the electrode terminals of battery cells 81 are connected by lead plates 85.

Such a battery pack has been required to offer higher output in recent years. In response to this demand, a capacity of each of the secondary battery cells and a number of the secondary battery cells are on the increase. Accordingly, there is a need for safety measures taken in the event of thermal runaway in part of the secondary battery cells. The conventional battery pack, which includes battery assembly 80 housed in bag-shaped waterproof container 83, is filled with a potting resin. The battery pack fills every gap between the secondary battery cells with the potting resin, such as a urethane resin, and thereby makes the inside temperature uniform. Even if temperature of one of the secondary battery cells rises, the battery pack allows conduction of the heat to components such as the other secondary battery cells via the potting resin and thus hinders a local temperature rise.

Unfortunately, this method involves filling the waterproof container with the potting resin and thus requires a large amount of the potting resin. This results in an increase in overall weight of the battery pack. A process of manufacturing the battery pack requires filling the waterproof container with the liquid potting resin and curing the resin. This is time-consuming and unfavorable in workability and disadvantageous in manufacturing tact time, costs, and other aspects.

CITATION LIST

Patent Literature

PTL 1: Unexamined Japanese Patent Publication No. H9-92237
PTL 2: Unexamined Japanese Patent Publication No. 2010-62093

SUMMARY OF THE INVENTION

The present invention has been accomplished in view of the above background. It is an object of the present invention to provide a battery pack that is given a function for hindering a rise in secondary battery cell temperature by a simple technique, as well as to provide a method for manufacturing the battery pack.

A battery pack according to a first aspect of the present invention includes a battery assembly, a heat radiation molding being molded in advance and having flexibility, and an external case housing the battery assembly. The battery assembly includes at least one secondary battery cell and a battery holder to hold and house the at least one secondary battery cell. The heat radiation molding covers a surface of the at least one secondary battery cell and is designed to melt in response to heat generated from the at least one secondary battery cell. As compared with the conventional technique of putting a potting resin throughout a battery assembly, the configuration described above enables any portion to have a heat radiation property by disposing the heat radiation molding at a portion required to have the heat radiation property. This contributes to a reduction in volume of the heat radiation molding and a reduction in weight of the battery pack, enabling simplification of a manufacturing process for the battery pack.

In a battery pack according to a second aspect of the present invention that includes the above configuration, the heat radiation molding may be made of a material that melts by an endothermic chemical reaction. This configuration, when the heat radiation molding melts in response to heat generated from the secondary battery cell in contact with the heat radiation molding, allows the heat radiation molding to display an effect of cooling the secondary battery cell by an endothermic chemical reaction.

In a battery pack according to a third aspect of the present invention that includes any one of the above configurations, the at least one secondary battery cell may be cylindrical in external appearance, and the heat radiation molding may be molded into a shape that is bent along a curved cylindrical side surface of the at least one secondary battery cell. This configuration allows the heat radiation molding to be disposed along the side surface of the cylindrical secondary battery cell.

In a battery pack according to a fourth aspect of the present invention that includes any one of the above configurations, the battery holder, in the battery assembly, may hold a plurality of the secondary battery cells adjacent to each other, and the heat radiation molding may be disposed so as to stretch over the secondary battery cells adjacent to each other. This configuration allows the single heat radiation molding to cover the plurality of the secondary battery cells and let the cells radiate heat.

In a battery pack according to a fifth aspect of the present invention that includes any one of the above configurations, the at least one secondary battery cell may be cylindrical in external appearance, the battery holder may include a pair of members that have respective cylindrical cell holders to hold both ends of the at least one secondary battery cell, and the heat radiation molding may cover a side surface of the at least one secondary battery cell exposed out of the cylindrical cell holders. According to this configuration, while the secondary battery cell is held by the battery holder, the heat radiation molding is allowed to cover the partly exposed curved cylindrical side surface and let the secondary battery cell radiate heat.

In a battery pack according to a sixth aspect of the present invention that includes any one of the above configurations, the heat radiation molding may be divided into a plurality of parts each covering a surface of the at least one secondary battery cell held by the battery holder.

In a battery pack according to a seventh aspect of the present invention that includes any one of the above configurations, the at least one secondary battery cell may be cylindrical in external appearance, the battery holder may hold a plurality of the secondary battery cells adjacent to each other, and the heat radiation molding may be formed into a shape of a ring that covers a side surface of the at least one secondary battery cell positioned at a periphery of the plurality of the secondary battery cells held by the battery holder.

In a battery pack according to an eighth aspect of the present invention that includes any one of the above configurations, the battery holder may include a molding pressing part to press the heat radiation molding against a surface of the at least one secondary battery cell. This configuration allows the heat radiation molding to be pressed against the surface of the secondary battery cell without use of a binding material and create a thermally coupled state.

In a battery pack according to a ninth aspect of the present invention that includes any one of the above configurations, the heat radiation molding may be made of a material that contains one of a urethane resin and a silicone resin.

In a battery pack according to a tenth aspect of the present invention that includes any one of the above configurations, the heat radiation molding may be made of a material containing a filler that induces an endothermic reaction. According to this configuration, an area of the heat radiation molding in contact with the at least one secondary battery cell is partly melted by heat generated from the secondary battery cell. This provides close adhesion without a binding material. This in turn reduces a gap that constitutes a heat insulating layer in a contact interface and readily creates a thermally coupled state with high heat transfer performance.

A battery pack according to an eleventh aspect of the present invention that includes any one of the above configurations may further include a waterproof container to house the battery assembly. The battery assembly housed in the waterproof container may be housed in the external case. This configuration ensures that the battery assembly is made waterproof.

A method of manufacturing a battery pack, according to a twelfth aspect of the present invention, is a method for manufacturing a battery pack that includes a battery assembly including a plurality of cylindrical secondary battery cells and a pair of battery holders to hold and house the cylindrical secondary battery cells and an external case housing the battery assembly. The method includes the step of preparing a heat radiation molding being molded in advance and having flexibility. The heat radiation molding is designed to cover a surface of at least one of the cylindrical secondary battery cells and is designed to melt in response to heat generated from the at least one cylindrical secondary battery cell. The method further includes the steps of inserting first ends of the cylindrical secondary battery cells into respective cylindrical cell holders of one of the pair of battery holders, putting the heat radiation molding over a side surface of at least one of the cylindrical secondary battery cells that is exposed out of each of the cylindrical cell holders, and inserting second ends of the cylindrical secondary battery cells into respective cylindrical cell holders of the other of the pair of battery holders. This method, as compared with the conventional technique of putting a potting resin throughout a battery assembly, enables any portion to have a heat radiation property by disposing the heat radiation molding at a portion required to have the heat radiation property. This contributes to a reduction in volume of the heat radiation molding and a reduction in weight of the battery pack, enabling simplification of a manufacturing process for the battery pack.

BRIEF DESCRIPTION OF DRAWINGS

FIGS. 7A to 7E are exploded perspective views illustrating a process for manufacturing a battery pack according to a second exemplary embodiment.

DESCRIPTION OF EMBODIMENTS

Figure 1:
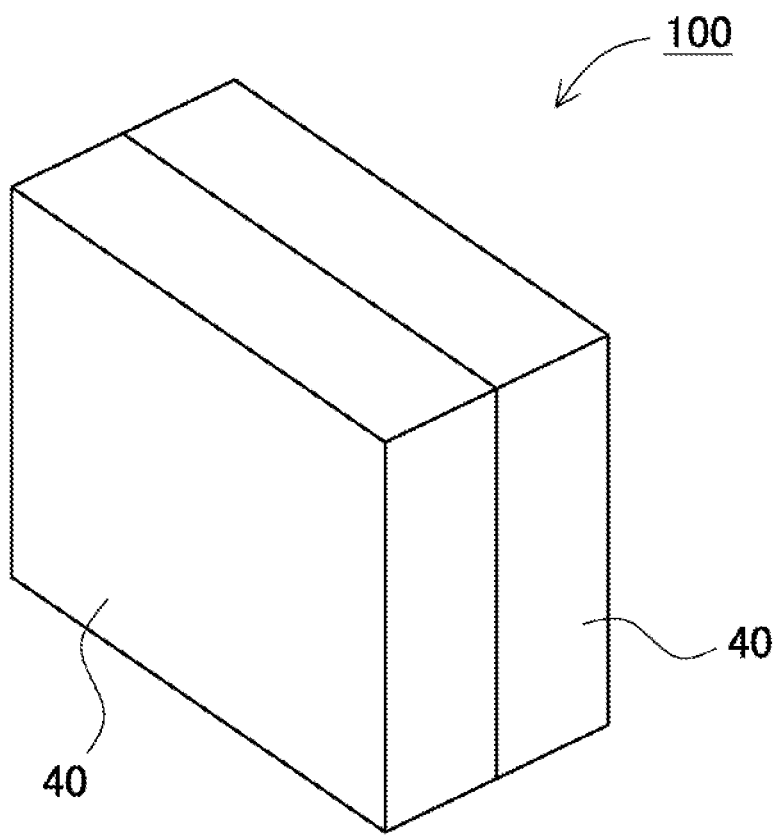
FIG. 1 is perspective view illustrating a battery pack according to a first exemplary embodiment of the present invention.

Exemplary embodiments of the present invention will be described below with reference to the drawings. However, the exemplary embodiments described below are examples that allow a technical idea of the present invention to be embodied, and the present invention is not limited to the exemplary embodiments described below. Further, in the present description, components described in the scope of claims are not limited to the components of the exemplary embodiments. In particular, it is not intended to limit the scope of the present invention to sizes, materials, and shapes of components, relative arrangement of the components, and the like that are described in the exemplary embodiments, unless otherwise specified. The sizes, materials, and shapes of the components and the relative arrangement of the components are mere explanation examples. Note that the sizes, the positional relation, and the like of the components in the drawings may be exaggerated for clarifying the explanation. Furthermore, in the following description, the same names or the same reference marks denote the same components or components of the same type, and detailed description is appropriately omitted. Regarding the elements constituting the present invention, a plurality of elements may be formed of the same component, and one component may serve as a plurality of elements. In contrast, the function of one component may be shared by a plurality of components.

First Exemplary Embodiment

Figure 2:
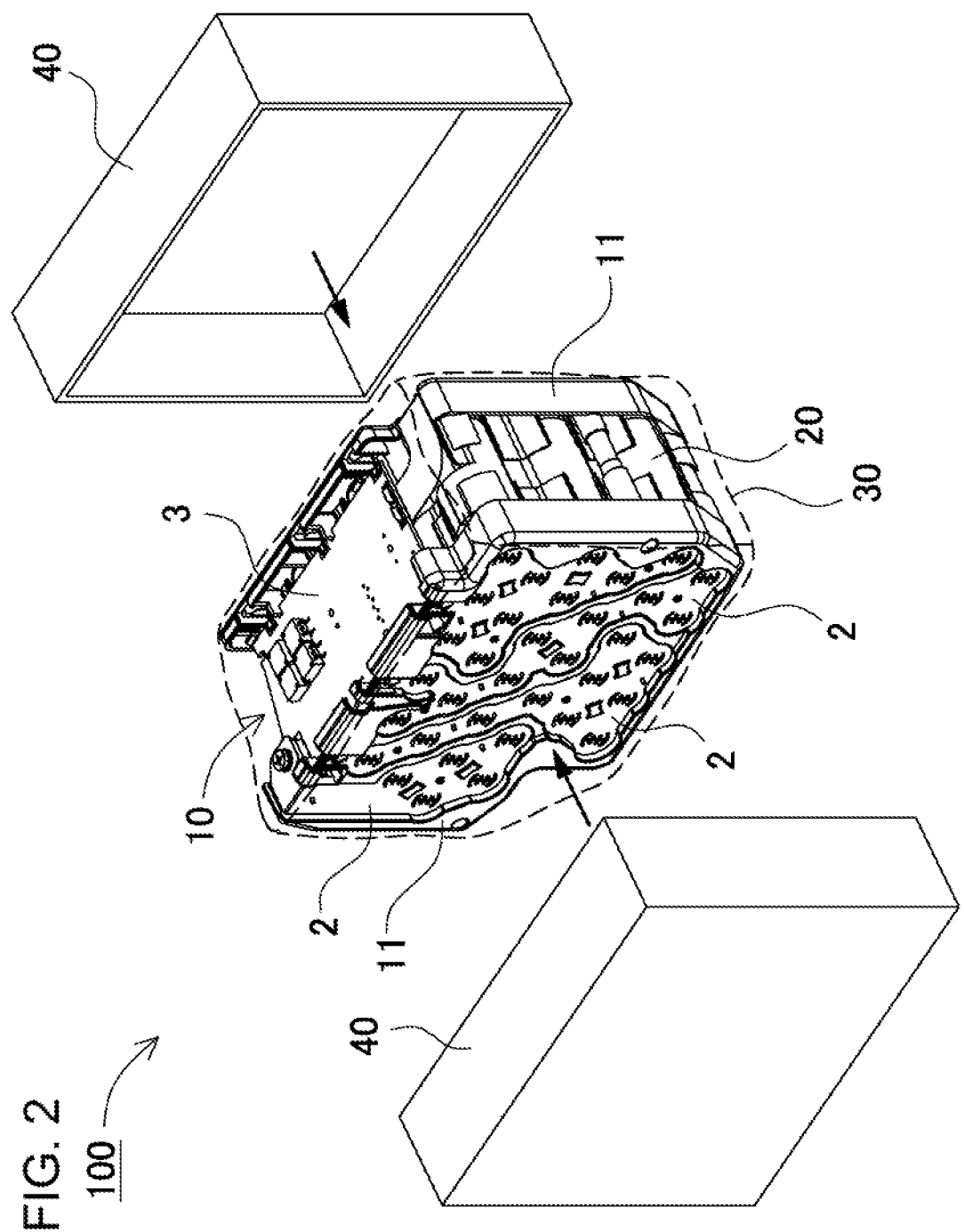
FIG. 2 is an exploded perspective view of the battery pack in FIG. 1.
Figure 3:
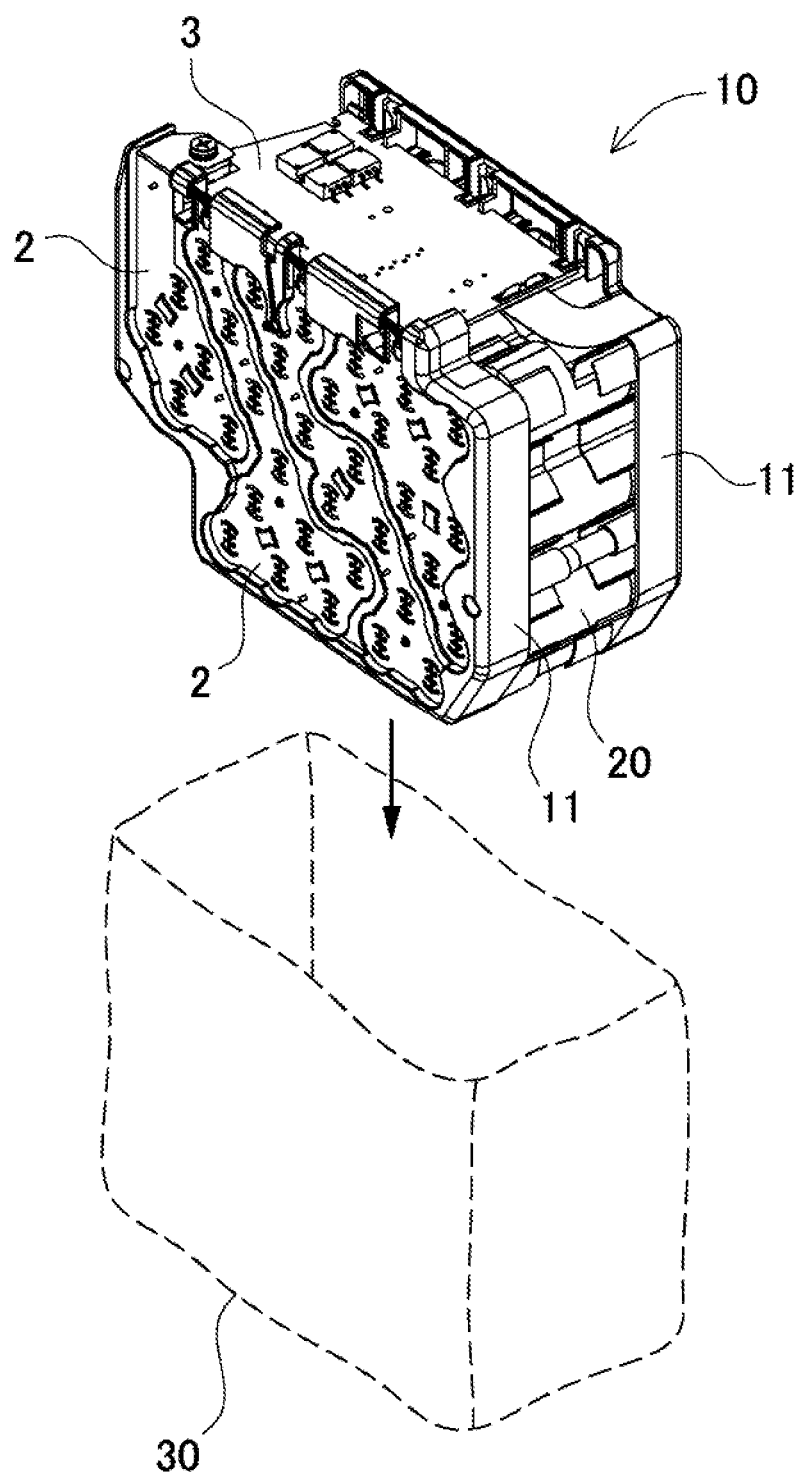
FIG. 3 is a perspective view illustrating a battery assembly in FIG. 2.
Figure 4:
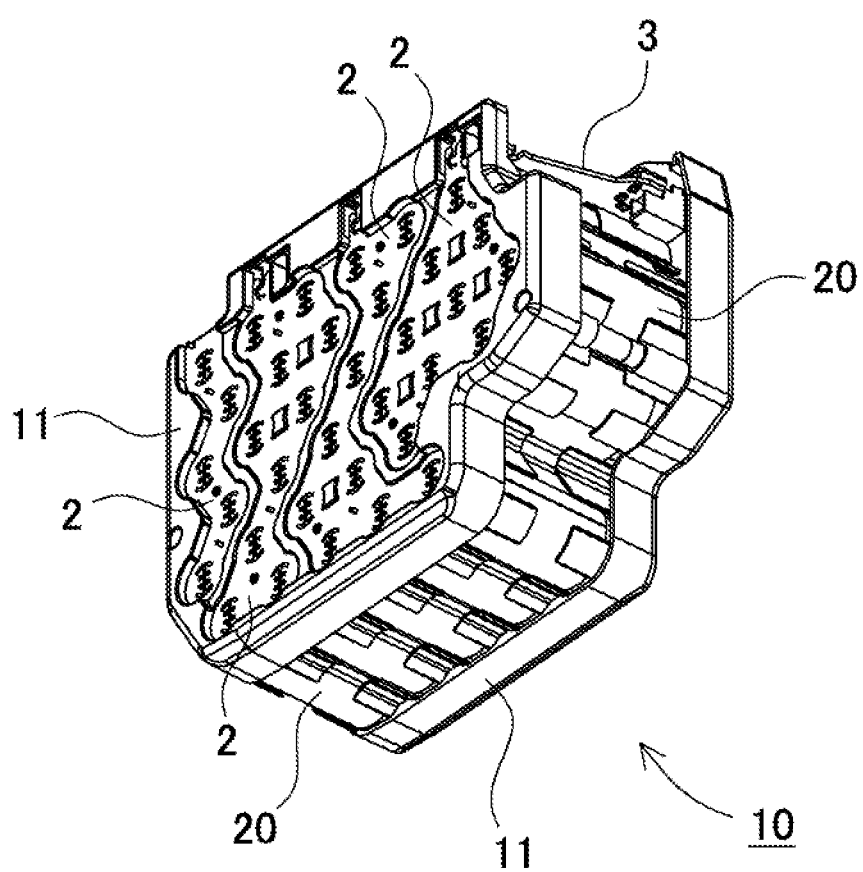
FIG. 4 is a bottom perspective view of the battery assembly in FIG. 3.
Figure 5:
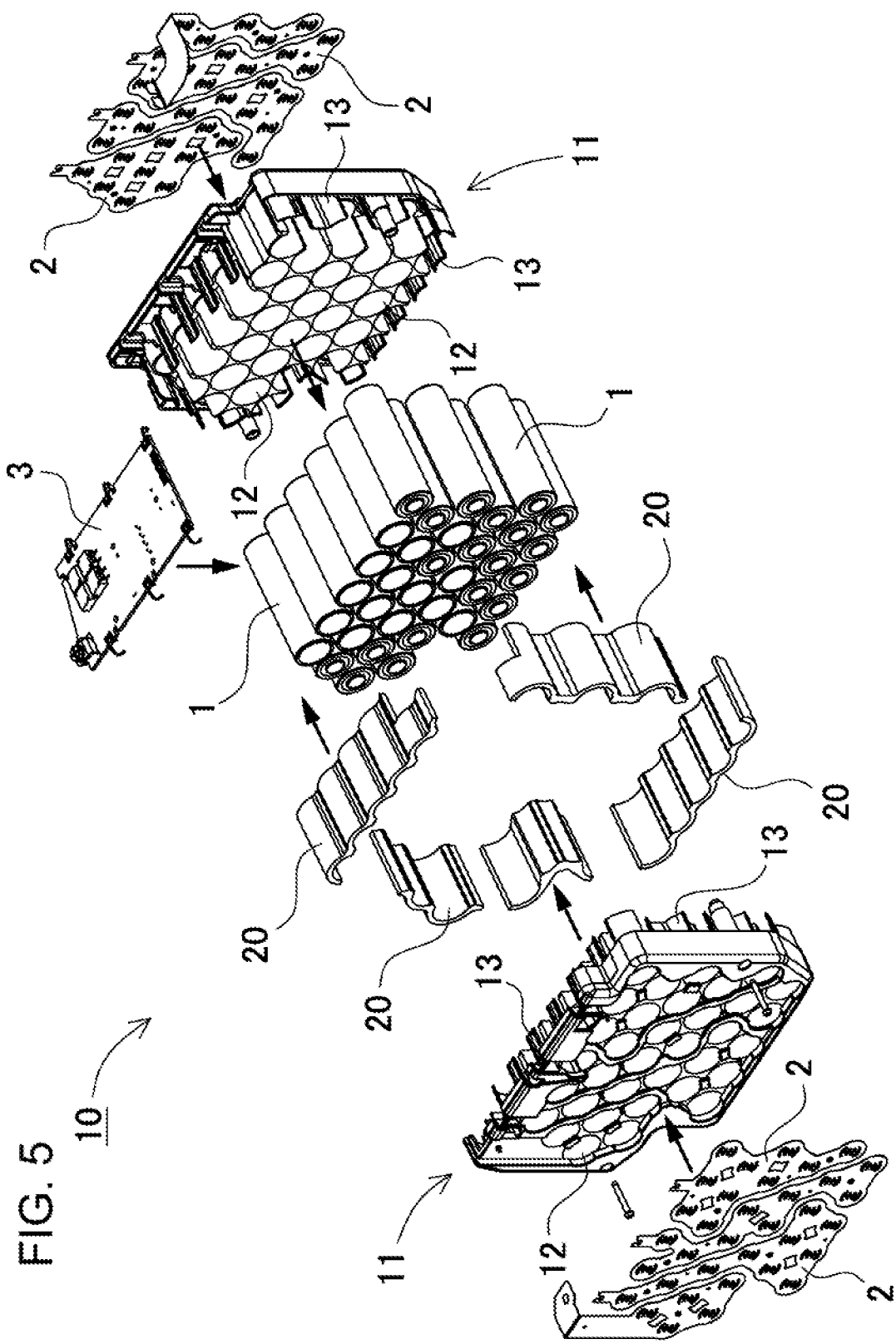
FIG. 5 is an exploded perspective view of the battery assembly in FIG. 3.
Figure 6:
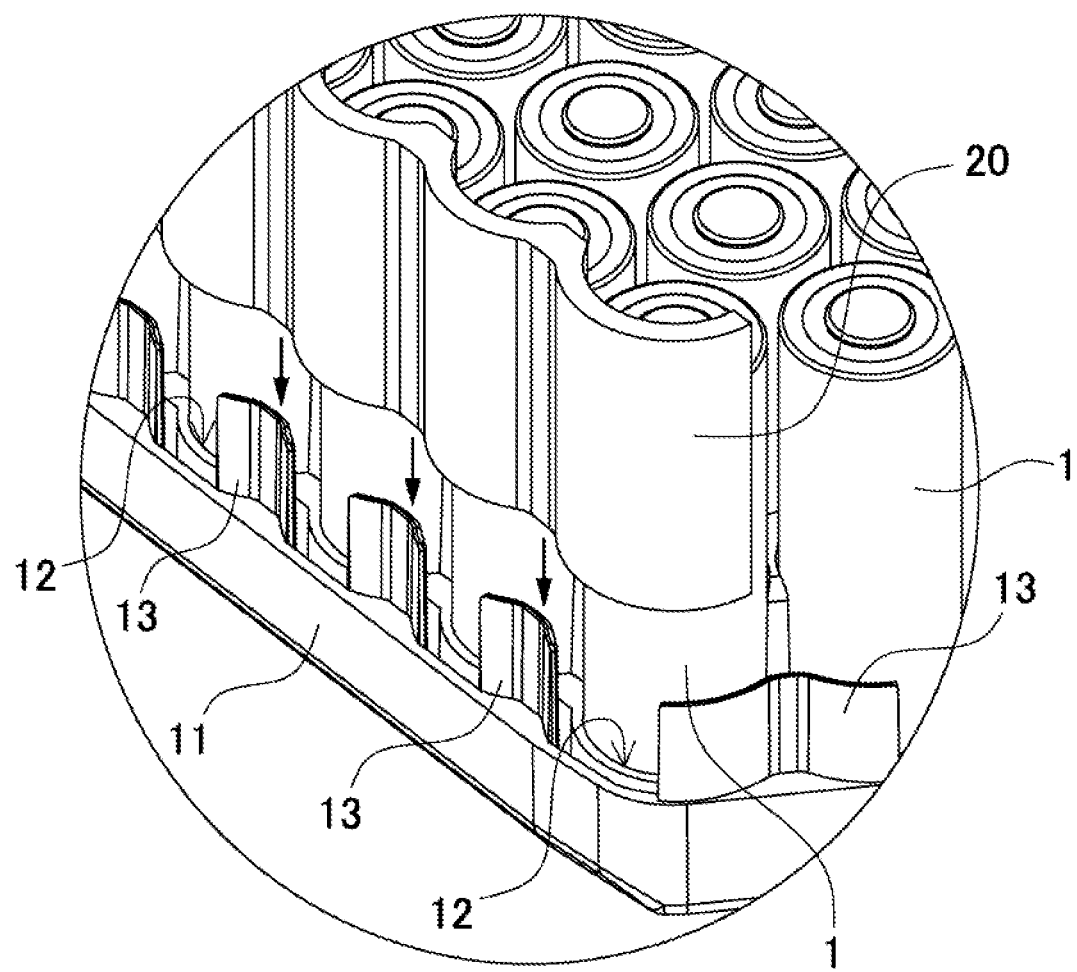
FIG. 6 is an enlarged exploded perspective view illustrating an area where a heat radiation molding is inserted.
Figure 8:
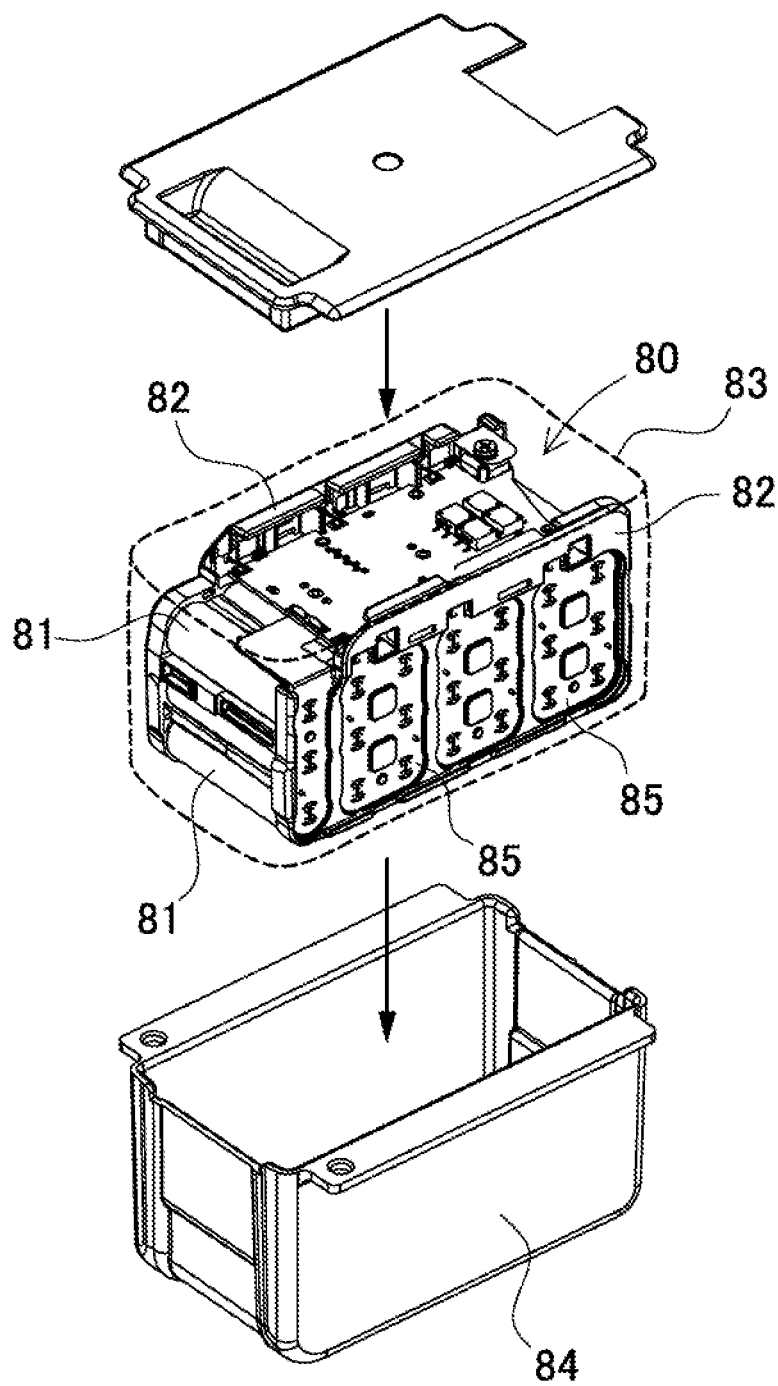
FIG. 8 is an exploded perspective view illustrating a conventional battery pack.

A battery pack according to a first exemplary embodiment is shown in FIGS. 1 to 7E. Of these drawings, FIG. 1 is a perspective view illustrating battery pack 100 according to a first exemplary embodiment of the present invention, FIG. 2 is an exploded perspective view of battery pack 100 in FIG. 1, FIG. 3 is a perspective view illustrating battery assembly 10 in FIG. 2, FIG. 4 is a bottom perspective view of battery assembly 10 in FIG. 3, FIG. 5 is an exploded perspective view of battery assembly 10 in FIG. 3, FIG. 6 is an enlarged exploded perspective view illustrating an area where a heat radiation molding is inserted, and FIGS. 7A to 7E are exploded perspective views illustrating a process for manufacturing a battery pack according to a second exemplary embodiment. An external shape of battery pack 100 shown in FIG. 1 is formed by box-shaped external case 40.

As shown in FIG. 2, external case 40 is divisible into two pieces and has a storage space inside. Battery assembly 10 is housed in the internal storage space of external case 40. External case 40 is made of a lightweight material having an excellent insulating property, such as a resin.

Battery assembly 10 is housed in a waterproof container and thereby displays a waterproof property. In an instance shown in FIG. 3, the battery assembly is covered with waterproof bag 30, an example of the waterproof container, to have a waterproof property. Waterproof bag 30 is made of a transparent resin such as polyethylene. If no waterproof function is needed, the waterproof bag may be omitted.

As shown in FIGS. 3 and 4, battery assembly 10 is formed into a box that is partly constricted in external shape. In battery assembly 10, as shown in the exploded perspective view of FIG. 5, a plurality of secondary battery cells 1 is housed in battery holder 11. Battery holder 11 is divided into two of right and left members and holds secondary battery cells 1 such that the battery cells are put between the two members. The members of battery holder 11 are, for example, fastened to each other by screws, fitting, welding, or other technique. The members of battery holder 11 have respective cylindrical cell holders 12 to hold ends of secondary battery cells 1. With secondary battery cells 1 put into battery holder 11, end faces of secondary battery cells 1 are exposed out of battery holder 11 and are welded to lead plates 2.

Secondary battery cell 1 is a cylindrical battery having a cylindrical exterior can. The secondary battery cell may be, for example, a lithium ion secondary battery, a nickel hydride secondary battery, or a nickel-cadmium secondary battery. Preferably, the secondary battery cell is a lithium ion secondary battery in particular because of high energy efficiency per unit volume. The plurality of secondary battery cells 1 is connected in series and/or in parallel, with electrodes on the end faces of the secondary battery cells connected by lead plates 2. In an example of FIG. 5, 35 secondary battery cells 1 are connected such that five groups of seven series-connected cells are connected in parallel. In response to this connection, a shape and a disposition of each lead plate 2 are determined.

Lead plate 2 is made of a metal having excellent conductivity. Lead plates 2 are connected to the end faces of secondary battery cells 1 by spot welding or other technique. Lead plates 2 are also connected to circuit board 3. Circuit board 3 is disposed on a surface of battery holder 11. Circuit board 3 is populated with or includes a charge-discharge circuit and a protection circuit for secondary battery cells 1.

(Heat Radiation Molding 20)

Heat radiation molding 20 is disposed on surfaces of secondary battery cells 1. Heat radiation molding 20 is a plate-shaped member that is molded in advance and is curved in accordance with a shape of the exterior cans of secondary battery cells 1. Heat radiation molding 20 is made of a material that has flexibility and melts in response to heat generated from secondary battery cell 1.

In a battery pack including a plurality of secondary battery cells arranged adjacent to each other, the secondary battery cells positioned at a periphery tend to get higher in temperature than the secondary battery cells positioned in a middle. Even if the temperature of the secondary battery cell positioned in the middle gets high, the heat is readily conducted to the surrounding secondary battery cells and as a result, a heat-absorbing effect is displayed. This reduces the possibility that only part of the secondary battery cells gets high in temperature. On the other hand, the secondary battery cell disposed at a periphery has a fewer number of the secondary battery cells in the vicinity and hence if the temperature of the peripheral secondary battery cell gets high, the heat has nowhere to escape. As a result, a function for hindering a local temperature rise is less likely to be fulfilled. Thus, the battery pack is required to have a mechanism for efficiently transferring heat generated from a secondary battery cell. To meet this need, in the conventional battery pack, a battery assembly is housed in a waterproof bag, a potting resin is injected into the waterproof bag, and the bag is hermetically sealed to put the injected potting resin into close contact with secondary battery cells through thermal coupling and thereby improve heat transfer performance.

However, the battery pack having this structure requires a large amount of the potting resin to be loaded to fill an internal space of the battery pack and thermally couple the injected potting resin with surfaces of all the secondary battery cells. This results in an increase in the amount of the potting resin and a rise in weight of the battery pack. Battery packs are required to be made smaller and lighter. Demand for weight reduction is high particularly for battery packs used in electric-assist bicycles because an increase in the weight of the battery pack requires a corresponding increase in driving force and impairs assistance effectiveness. Use of a large amount of the potting resin increases manufacturing costs and requires time and effort in a manufacturing process, such as a step for injection of the liquid potting resin and time taken to wait until the liquid resin is cured or hardened. This results in prolonged tact time, causing a disadvantage in productivity and a further increase in manufacturing costs.

In contrast to the conventional configuration, battery pack 100 according to the present exemplary embodiment includes heat radiation molding 20 that provides high heat transfer performance instead of the injected and cured potting resin. The heat radiation molding is molded in advance and is put over a periphery of secondary battery cells 1 at a time of assembly to improve the radiation of heat from secondary battery cells 1 positioned at the periphery of battery assembly 10. This method enables any portion to have a heat radiation property by disposing heat radiation molding 20 at a portion required to have the heat radiation property as compared with the method of putting the potting resin throughout battery assembly 10. A volume of heat radiation molding 20 can be reduced to make the battery pack lighter. Solid heat radiation molding 20 molded in advance is allowed to be disposed at the periphery of secondary battery cells 1. This enables substantial simplification of a manufacturing process as compared with the process of injecting and curing the liquid potting resin.

Heat radiation molding 20 is molded in advance into a shape that runs along an external shape of secondary battery cells 1 in order to be readily put into close contact with the periphery of secondary battery cells 1. Further, being made of a material having flexibility, the heat radiation molding is readily deformable to suit the actual shape of secondary battery cells 1 and is thus designed to offset manufacturing tolerance for the exterior cans, an error at the time of assembly, and other margins to provide further improved adhesion. In the example of FIG. 5, cylindrical secondary battery cells 1 are arranged and held by battery holder 11 such that side faces of the secondary battery cells are adjacent to each other. Battery holder 11 holds cylindrical secondary battery cells 1 with the end faces of the secondary battery cells being partly inserted in cell holders 12, and middle portions of the exterior cans are exposed out of battery holder 11. Thus, heat radiation molding 20 is disposed on the exposed portions of the exterior cans.

(Molding Pressing Part 13)

Heat radiation molding 20 is joined to at least part of the side faces of secondary battery cells 1 through thermal coupling. Heat radiation molding 20 may be attached to the side faces of secondary battery cells 1 with a binding material such as double-sided tape or an adhesive. Alternatively, battery holder 11 may have molding pressing part 13 to physically press heat radiation molding 20 against the surfaces of secondary battery cells 1. The example of battery holder 11 shown in both FIG. 5 and the enlarged cross-sectional view of FIG. 6 has ribs as molding pressing part 13. The ribs are formed at portions where the exterior cans of secondary battery cells 1 are exposed out of battery holder 11. Heat radiation molding 20 is press-fitted between secondary battery cells 1 and the ribs. This configuration enables heat radiation molding 20 to be readily pressed against the surfaces of secondary battery cells 1 at the time of assembly. This eliminates the need for application of a binding material and provides an improvement in assembly workability.

The ribs are each formed into a shape that runs along an external shape of heat radiation molding 20. The ribs are substantially parallel to cell holders 12 and protrude along a direction in which cell holders 12 extend such that the ribs are separated from the surfaces of secondary battery cells 1 inserted into cell holders 12 at a distance equal to or slightly shorter than a thickness of heat radiation molding 20. This configuration allows heat radiation molding 20 having flexibility to be pressed into a gap between the ribs and secondary battery cells 1 and be put into close contact with the surfaces of secondary battery cells 1 without any gap.

The ribs are not necessarily disposed to cover an entire surface of heat radiation molding 20 but may be formed so as to partly press heat radiation molding 20. In the example of FIG. 6, the ribs each are disposed at a position of a dip between cylindrical secondary battery cells 1 adjacent to each other. This can avoid a situation that arises if the ribs each are disposed at an apex of cylindrical secondary battery cell 1, i.e., the ribs protruding outward make the battery holder thicker and larger. The ribs may each be formed into any shape other than the wall shape as appropriate, such as a rod shape, with proviso that the ribs are able to hold the heat radiation molding.

Further, a contact surface of heat radiation molding 20 may provide close adhesion by being melted by heat generated from secondary battery cells 1. This method enables heat radiation molding 20 to be put into close contact with secondary battery cells 1 without an adhesive. This can avoid a situation where heat transfer is inhibited due to a heat insulation effect of an air layer that results from a gap formed between the surface of the exterior can and heat radiation molding 20.

Heat radiation molding 20 is made of a material that provides high heat transfer and absorbing performance. For instance, the material is preferably a urethane resin, which is used as the potting resin in the conventional art. A heat radiation molding made of such a material has a thermal capacity and thereby displays a heat-absorbing property.

In addition, the material is preferably a material that melts by an endothermic reaction rather than an exothermic reaction. This enables the heat radiation molding to exhibit an effect of removing heat by an endothermic chemical reaction as well when secondary battery cell 1 generates heat. Such a material may be preferably a urethane resin material containing a filler component that induces an endothermic reaction in a high temperature range. In this case, the filler component used to induce the endothermic reaction in the high temperature range exhibits a heat radiation hindrance effect further.

Heat radiation molding 20 is disposed so as to stretch over secondary battery cells 1 adjacent to each other. This allows the adjacent secondary battery cells to be thermally coupled together. This configuration, even if one of the secondary battery cells generates heat, enables the other secondary battery cell to absorb part of the generated heat. In other words, the heat radiation molding does not insulate heat between the adjacent secondary battery cells but provides improved heat transfer performance. This configuration allows heat generated from a part of the secondary battery cells to be absorbed by the surrounding secondary battery cells and thereby hinders thermal runaway.

In the examples of FIG. 5 and other drawings, the heat radiation molding does not cover an entire circumference of each of the secondary battery cells. Heat radiation molding 20 covers exposed surfaces of the secondary battery cells positioned at the outer periphery of assembled secondary battery cells 1. As described above, the secondary battery cell disposed at the outer periphery is adjacent to few secondary battery cells in the vicinity and accordingly provides decreased heat transfer performance. Thus, heat radiation molding 20 covers only an area where few adjacent secondary battery cells exist to improve heat transfer performance and hence the peripheral secondary battery cells can display a heat transfer property on par with that of the secondary battery cells positioned in the middle of battery assembly 10. However, the scope of the present invention is not limited to a configuration in which a heat radiation molding is put over only an exposed area of secondary battery cells that make up a battery stack. For instance, a heat radiation molding may be interposed between adjacent secondary battery cells in a middle zone. This configuration allows the middle zone to provide further improved heat transfer performance and displays an effect of hindering part of the secondary battery cells from entering thermal runaway.

As shown in FIG. 5, heat radiation molding 20 is divided into a plurality of parts that are each disposed on a periphery of stacked secondary battery cells 1. The division of heat radiation molding 20 in this way facilitates the insertion of the heat radiation molding into the space beside the ribs of battery holder 11. However, the present invention is not limited to this configuration. As shown in FIG. 7B, a heat radiation molding may be formed in one piece according to a second exemplary embodiment. Heat radiation molding 20' is formed into the shape of a ring that covers side surfaces of cylindrical secondary battery cells 1 positioned at a periphery of a plurality of cylindrical secondary battery cells 1 held by a battery holder. This configuration makes a posture of heat radiation molding 20' clear and advantageously reduces assembly errors such as a mix-up between parts and an incorrect orientation.

(Method of Manufacturing Battery Pack)

As an example of a method for manufacturing a battery pack, with reference to FIGS. 7A to 7E, a method of assembling battery assembly 10' according to the second exemplary embodiment will be described. First, as shown in FIG. 7A, one of two divided members of battery holder 11 is disposed at a lower side, and secondary battery cells 1 are inserted into respective cell holders 12. Next, as shown in FIG. 7B, with secondary battery cells 1 standing upright on the one member of battery holder 11, heat radiation molding 20' prepared in advance is disposed. Heat radiation molding 20' is put over an area of the side surfaces of secondary battery cells 1 that is not covered with cell holders 12 of battery holder 11. In this example, heat radiation molding 20' is press-fitted and fixed in a gap between ribs, a mode of molding pressing part 13, and secondary battery cells 1.

In this state, as shown in FIG. 7C, the other member of battery holder 11 is put over an upper side of secondary battery cells 1 standing upright. At the same time, when upper edges of secondary battery cells 1 are inserted into battery cell holders 12 of the other member of the battery holder, attention is paid so that the ribs of the other member of battery holder 11 are pressed against heat radiation molding 20' put into close contact with the surfaces of secondary battery cells 1. Then, the members of battery holder 11 are fastened to each other with screws. Lead plates 2 disposed on sides of battery holder 11 are joined to end faces of secondary battery cells 1 by spot welding or other technique. Next, battery assembly 10' laid sideways is put into an upright position as shown in FIG. 7D. Circuit board 3 is fixed to an upper surface of the battery assembly, and circuit board 3 and lead plates 2 are connected together. In this way, a battery cell assembly is made as shown in FIG. 7E.

The battery cell assembly made in this way is put into waterproof bag 30 as shown in FIG. 3 and is sealed hermetically. Then, as shown in FIG. 2, the bag containing the assembly is housed in the space between the right and left pieces of external case 40 to make battery pack 100 shown in FIG. 1.

As compared with the conventional technique of putting the potting resin throughout the battery assembly, the technique in the above exemplary embodiments enables any portion to have a heat radiation property by disposing the heat radiation molding at a portion required to have the heat radiation property. This contributes to a reduction in the volume of the heat radiation molding and a reduction in the weight of the battery pack, enabling simplification of the manufacturing process. An area of the heat radiation molding in contact with the secondary battery cells is partly melted by heat generated from the secondary battery cells. This provides close adhesion without a binding material. This in turn reduces a gap that constitutes a heat insulating layer in a contact interface and readily creates a thermally coupled state with high heat transfer performance. The heat radiation molding helps improve heat transfer performance between the secondary battery cells to make temperature of the battery cells uniform. Even if temperature of one of the secondary battery cells rises, the battery pack allows conduction of the heat to components such as the other secondary battery cells via the heat radiation molding and thus hinders a local temperature rise.

In the example described above, the secondary battery cells are cylindrical batteries. Thus, the heat radiation molding used for the cylindrical batteries is corrugated such that the molding is shaped into a series of curves that are each bent along a side surface of the cylindrical exterior can. However, this does not limit the scope of the present invention, and the secondary battery cells may be batteries of any shape other than cylindrical batteries, such as rectangular batteries and laminate-shaped batteries. In such a case, a heat radiation molding is designed to have a shape that suits the shape of the secondary battery cell so as to be readily put into close contact with the surface of the secondary battery cell.

The configuration of the exemplary embodiments can dispense with a bag or another container into which a potting resin is injected. Although in the example of FIG. 3, battery assembly 10 is housed in waterproof bag 30 to display a waterproof property, this waterproof bag is not for the injection of any potting resin. Thus, the waterproof bag can be omitted, for example, if the waterproof function is unnecessary or can be fulfilled by means other than the waterproof bag (e.g., sealing a gap that constitutes a route for water entry).

INDUSTRIAL APPLICABILITY

A battery pack and a method for manufacturing the battery pack according to the present invention can be suitably applied to power sources for electric tools, electric-assist bicycles, electric motorcycles, hybrid electric vehicles, electric vehicles, and other electric equipment, as well as power sources for power storage at households, stores, and other places.

The invention claimed is:

1. A battery pack comprising:
   a battery assembly including at least one secondary battery cell and a battery holder to hold and house the at least one secondary battery cell;
   a heat radiation molding being molded in advance and having flexibility, the heat radiation molding covering a surface of the at least one secondary battery cell and being designed to melt in response to heat generated from the at least one secondary battery cell; and
   an external case housing the battery assembly,
   wherein the at least one secondary battery cell is cylindrical in external appearance,
   wherein the battery holder includes a pair of members that have respective cylindrical cell holders to hold both ends of the at least one secondary battery cell, wherein a middle portion of an exterior can of the at least one secondary battery cell is exposed outside the battery holder,
   wherein the battery holder further includes a rib facing a portion of the exterior can of the at least one secondary battery cell exposed outside the cylindrical cell holders of the battery holder,
   wherein the heat radiation molding is press-fitted between the at least one secondary battery cell and the rib, and
   wherein the heat radiation molding covers a side surface of the at least one secondary battery cell at the middle portion of the exterior can of the at least one secondary battery cell exposed outside the battery holder.

2. The battery pack according to claim 1,
   wherein the heat radiation molding is made of a material that melts by an endothermic chemical reaction.

3. The battery pack according to claim 1,
   wherein the heat radiation molding is molded into a shape that is bent along a curved cylindrical side surface of the at least one secondary battery cell.

4. The battery pack according to claim 1,
   wherein in the battery assembly, the battery holder holds a plurality of the secondary battery cells adjacent to each other, and
   wherein the heat radiation molding is disposed so as to stretch over the secondary battery cells adjacent to each other.

5. The battery pack according to claim 1,
   wherein the heat radiation molding is divided into a plurality of parts each covering a surface of the at least one secondary battery cell held by the battery holder.

6. The battery pack according to claim 1,
   wherein the battery holder holds a plurality of the secondary battery cells adjacent to each other, and wherein the heat radiation molding is formed into a shape of a ring that covers a side surface of the at least one secondary battery cell positioned at a periphery of the plurality of the secondary battery cells held by the battery holder.

7. The battery pack according to claim 1,
wherein the heat radiation molding is made of a material that contains one of a urethane resin and a silicone resin.

8. The battery pack according to claim 1, further comprising a waterproof container to house the battery assembly,
wherein the battery assembly housed in the waterproof container is housed in the external case.

9. A method for manufacturing a battery pack that comprises:
a battery assembly including a plurality of cylindrical secondary battery cells and a pair of battery holders to hold and house the cylindrical secondary battery cells; and
an external case housing the battery assembly, the method comprising the steps of:
preparing a heat radiation molding being molded in advance and having flexibility, the heat radiation molding being designed to cover a surface of at least one of the cylindrical secondary battery cells and being designed to melt in response to heat generated from the at least one cylindrical secondary battery cell;
inserting first ends of the cylindrical secondary battery cells into respective cylindrical cell holders of one of the pair of battery holders;
putting the heat radiation molding over a side surface of at least one of the cylindrical secondary battery cells that is exposed out of each of the cylindrical cell holders;
inserting second ends of the cylindrical secondary battery cells into respective cylindrical cell holders of the other of the pair of battery holders; and
providing a rib to face a portion of an exterior can of at least one cylindrical secondary battery cell exposed outside the cylindrical cell holders of the battery holder, wherein the heat radiation molding is press-fitted between the at least one cylindrical secondary battery cell and the rib,
wherein a middle portion of the exterior can of the at least one cylindrical secondary battery cell is exposed outside the battery holder, and
wherein the side surface of the at least one cylindrical secondary battery cell covered by the heat radiation molding is located at the middle portion of the exterior can of the at least one cylindrical secondary battery cell exposed outside the battery holder.

* * * * *